United States Patent
Cannon et al.

(10) Patent No.: US 6,466,787 B1
(45) Date of Patent: Oct. 15, 2002

(54) CORDLESS DEVICES AND METHODS FOR ORDERING NARROW BAND COMMUNICATION CHANNELS USING ALGORITHMS NOT BASED ON CHANNEL CLARITY

(75) Inventors: Joseph M. Cannon, Harleysville; Richard Lawrence McDowell, Chalfont; Philip David Mooney, North Wales, all of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/270,521

(22) Filed: Mar. 17, 1999

(51) Int. Cl.$^7$ .......................... H04M 11/00; H04Q 7/00
(52) U.S. Cl. ...................... 455/434; 455/462; 455/463; 455/464; 455/426
(58) Field of Search ................. 455/434, 452, 455/464, 462, 426, 463

(56) References Cited

U.S. PATENT DOCUMENTS 5,197,093 A * 3/1993 Knuth et al. ................. 455/464
5,363,428 A * 11/1994 Nagashima ................. 455/452

* cited by examiner

Primary Examiner—Daniel Hunter
Assistant Examiner—Alan T. Gantt
(74) Attorney, Agent, or Firm—John E. Curtin, Esq.; Troutman Sanders LLP

(57) ABSTRACT

Methods and devices are provided for overcoming interference which occurs when one or more cordless devices seek to communicate over the same range of narrow band channels. Any one of a number of algorithms not based on channel clarity may be utilized to order groups of available channels which surround a cordless device. The device then selects a channel from within the ordered group of channels to assure clear communications between a cordless telephone handset and base. The algorithm may be randomly selected from among a number of algorithms or may be selected by other means.

51 Claims, 4 Drawing Sheets

CORDLESS DEVICES AND METHODS FOR ORDERING NARROW BAND COMMUNICATION CHANNELS USING ALGORITHMS NOT BASED ON CHANNEL CLARITY

BACKGROUND OF THE INVENTION

As the number and use of cordless devices grows, so does the possibility that communications involving separate devices will interfere with one another. The present invention is aimed at reducing the possibility that cordless devices might interfere with each others' communications.

A typical cordless telephone system is made up of a base unit and handset. During the time when no telephone calls are being sent or received by the system, the base is typically scanning the frequency/channel environment surrounding the system. It does this to determine the clearest channel of communications between the base and handset. When a call is received or sent, the base unit seizes a pre-established channel which may or may not be a clear channel. As soon as a communications link is established the base commands the handset to change to a new channel.

The new channel has been previously "ranked" or "ordered" by the base as the best or clearest channel available prior to maintaining communications with the handset. Many cordless devices available today use the same ranking algorithms, e.g. received signal strength indication ("RSSI"), to determine which of the available channels is the clearest.

If two or more base units are operating within the same environment interference problems may arise if both base units need to initiate communications. For example, because both base units will be scanning the same radio frequency environment using the same ranking algorithm to determine the best channel available, each will probably try to seize the same channel. If this happens and the bases transfer communications over the same channel to different handsets, interference may occur.

Accordingly, it is an object of the present invention to provide cordless devices, programmed devices and methods which reduce the possibility that interference will occur in such an environment.

It is another object of the present invention to provide cordless devices, programmed devices and methods which order narrow band, communication channels to reduce the possibility that interference and like problems will occur in such an environment.

It is yet another object of the present invention to provide cordless devices, programmed devices and methods which order narrow band, communication channels using algorithms which are not based on channel clarity to reduce the possibility that interference and like problems will occur in such an environment.

Other objectives, features and advantages of the present invention will become apparent to those skilled in the art from the following description taken in conjunction with the accompanying drawings.

SUMMARY OF THE INVENTION

The present invention overcomes the problems associated with interference and the like by utilizing algorithms which order the available channels in a given environment by some additional criteria other than channel clarity/quality. By using criteria in addition to channel clarity, the devices and methods envisioned by the present invention create unique channel orderings not utilized by existing cordless devices. Thus, in an environment which requires or involves the use of multiple cordless devices, a device which comprises features of the present invention will select a channel of communication which is less likely to suffer from interference problems or the like.

In accordance with the present invention there are provided cordless devices, programmed devices and methods which provide the advantages just discussed.

The present invention provides for devices which order narrow band, communication channels. These devices comprise: a scanning unit or scanning means for scanning narrow band communication channels; and a ranking unit or ranking means for grouping the scanned channels into channel groups, each group comprising a channel or channels which has a channel clarity within a certain range and for ordering each group of channels using an algorithm which does not rely upon channel clarity. The ranking unit may be adapted to randomly select the "non-channel-clarity algorithm" from a number of non-channel-clarity algorithms or select the algorithm by other means. Other preferred devices may additionally comprise an algorithm memory or memory means for storing non-channel-clarity algorithms and/or a ranking memory or memory means for storing ranked and/or ordered groups of channels.

In accordance with other aspects of the present invention there are provided methods which order narrow band, communication channels for a communications device. These methods comprise: scanning narrow band communication channels; grouping the scanned channels into channel groups, each group comprising a channel or channels which has a channel clarity within a certain range; and ordering each group of channels using a non-channel-clarity channel-clarity algorithms and/or storing ranked and/or ordered groups of channels. Other methods comprise selecting the non-channel-clarity algorithm from a number of non-channel-clarity algorithms and/or randomly selecting the non-channel-clarity algorithm from a number of non-channel-clarity algorithms.

The present invention further provides for programmed devices which order narrow band, communication channels. These programmed devices comprise programs or program means which in turn comprise program code or code means. In one embodiment, the program means comprises: program code means for scanning narrow band communication channels; program code means for grouping the scanned channels into channel groups, each group comprising a channel or channels which has a channel clarity within a certain range; and program code means for ordering each group of channels using a non-channel-clarity algorithm. Additional embodiments may comprise program code means for storing the ranked and/or ordered groups of channels; program code means for selecting the non-channel-clarity algorithm from a number of non-channel-clarity algorithms; and program code means for randomly selecting the non-channel-clarity algorithm from a number of non-channel-clarity algorithms.

In all of the embodiments of the devices, programmed devices and methods discussed above the non-channel-clarity algorithm may comprise: an algorithm which orders channels within a group by channel number or by channel frequency; a pseudorandom number generation algorithm for randomly ordering the channels within each group; and an algorithm which makes use of a "last channel used." In addition, the range of channel clarity used to group channels is preferably a perceptible range of channel clarity. The devices and programmed devices may comprise a cordless telephone system, base of a cordless telephone system, handset of a cordless telephone system or a part of a cordless device or system.

The present invention and its advantages can be best understood with reference to the drawings, detailed description of the embodiments and claims that follow.

DETAILED DESCRIPTION OF THE INVENTION

The present invention can best be described by referring to a number of examples. These examples will illustrate the features of the present invention, but in no way are intended to limit the scope of the present invention.

Figure 1:
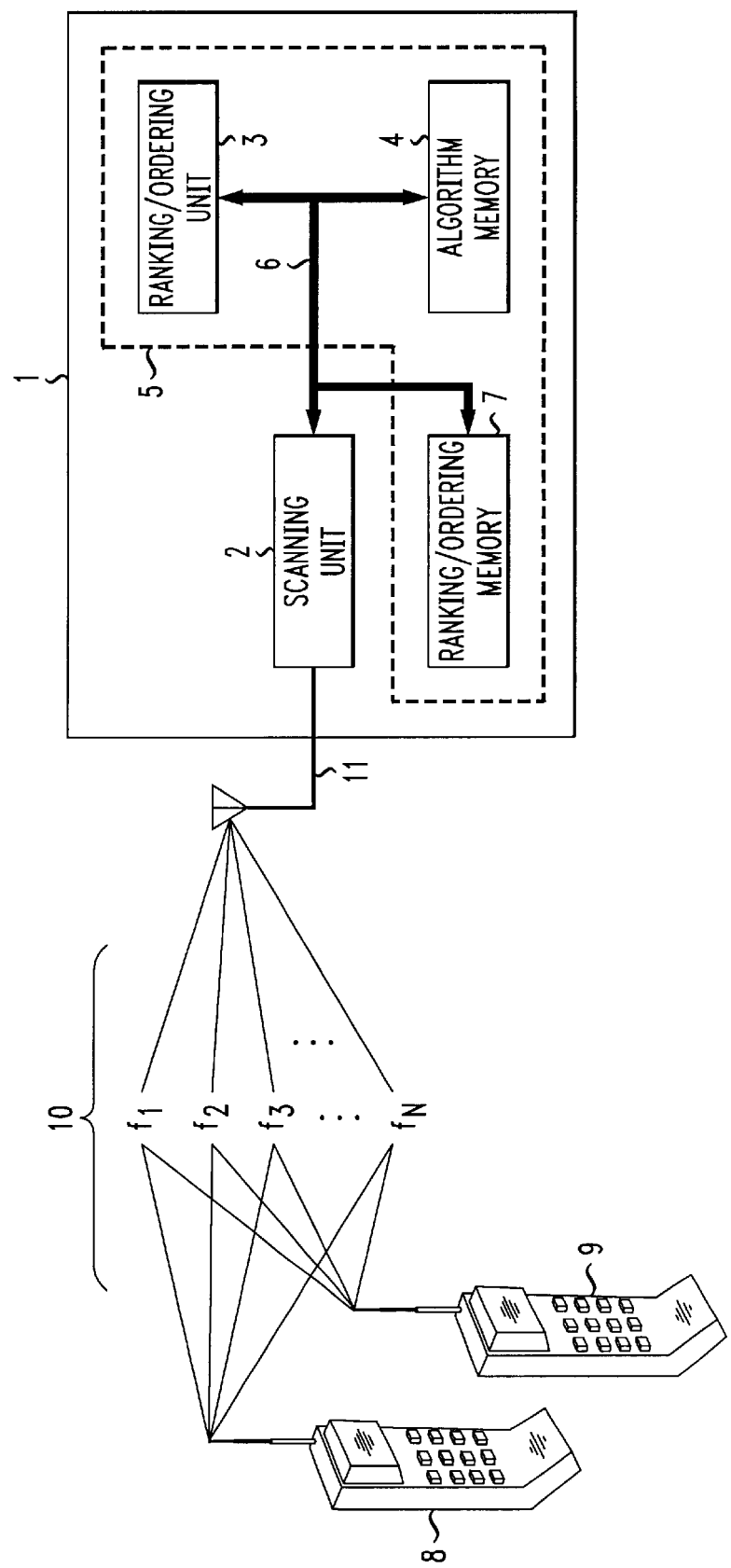
FIG. 1 depicts a communications device for ordering narrow band, communication channels according to an embodiment of the present invention.

One example, or embodiment, of the present invention is shown in FIG. 1.

FIG. 1 shows a communications device 1 communicating with a handset 8 of a cordless telephone via a narrow band of frequencies or channels $f_1, f_2, f_3 \ldots f_N$. For present purposes "narrow band" is meant to include low power cordless telephones which utilize the same channel for communication over an extended period of time. In one embodiment of the invention, device 1 comprises a cordless telephone operating in a narrow band channel of 900 MHZ or 2.4 GHz.

It should be understood that although a range of channels $f_1, f_2, f_3 \ldots f_N$, is shown, only one channel selected from $f_1, f_2, f_3 \ldots f_N$ is used by the handset 8 and device 1 to communicate with each other at one time. The device 1 may comprise the base of a cordless telephone. Together, the base 1 and handset 8 comprise a complete cordless telephone system.

Though only one channel is used by the device 1 to communicate with handset 8, device 1 is capable of selecting which channel among $f_1, f_2, f_3 \ldots f_N$ will be used. The selection of the channel to be used is most often completed when the device 1 and handset 8 are not in communication with one another, during a so-called "sniff" mode or standby time period.

As shown, the device 1 comprises a scanning unit 2 and ranking/ordering unit 3. During the time when the device 1 and handset 8 are operating in a "sniff" mode the scanning unit 2 is continually scanning the frequency/channel environment 10, i.e., channels, available for communications between the device 1 and handset 8. To simplify the following explanation, $f_1, f_2, f_3 \ldots f_N$ represents the range of channels available for communications. In addition to scanning channels $f_1, f_2, f_3 \ldots f_N$, the device 1 will also rank channels $f_1, f_2, f_3 \ldots f_N$ using ranking/ordering unit 3. Channels are "ranked" in order to determine the best channel available for communications between the handset 8 and device 1.

Typically, channels like $f_1, f_2, f_3 \ldots f_N$ are ranked according to channel clarity. A specific manner of ranking channels is referred to as an "algorithm". One common algorithm ranks the clearest channel first, followed by the next clearest channel with the least clearest channel ranked last. To utilize this algorithm, the clarity or quality of each channel must first be determined. Channel clarity can be determined in a number of different ways. One way utilizes a RSSI algorithm which is an algorithm based on power measurements.

Suppose then, that the scanning unit 2 of device 1 scans the narrowband channels $f_1, f_2, f_3 \ldots f_N$. For each channel scanned the device determines its RSSI level. The ranking/ordering unit 3 then selects a ranking algorithm from the algorithm memory 4. The algorithm initially selected proceeds to rank the channels according to their RSSI levels. The lowest RSSI level, indicating a clear channel, will be ranked first and the highest RSSI level, indicating a problem channel, will be ranked last. The so ranked channels may then be stored in ranking/ordering memory 7.

It should be understood that the RSSI levels being measured represent power measurements of the available channels. These measurements are made during the sniff mode of device 1. During this mode, the device 1 and handset 8 are not communicating with one another. Thus, the RSSI power level measured for a given channel will represent the presence or absence of another, potentially, interfering signal among other things. Thus, if an interfering signal exists, the RSSI power level of the corresponding channel being used by the signal will be high. If no signal is present, the RSSI power level of the channel will be low.

When a user of the handset 8 wishes to make an outgoing call, the device 1 is triggered to leave its "sniff" mode and establishes a connection with the handset 8 on a known channel. The device 1 then seizes a channel $f_1, f_2, f_3 \ldots f_N$. The device 1 is typically designed to retrieve the channel having the highest ranking (i.e., clearest channel) from memory 7. Hopefully, this channel will be available at the time it is needed. Sometimes, however, the channel selected will have already been seized by another device operating in the same environment.

Sometimes this situation may occur when two handsets, like handsets 8 and 9 in FIG. 1, are operating with one base unit 1. Other times this situation will arise when two or more devices or base units (only one is shown in FIG. 1) are operating in close proximity to one another and are connected to the same phone line. Because most devices use the same basic ranking algorithm as described above, it is no surprise that each device will rank each channel the same way, and then, come the time for communicating with a handset, seek to seize the very same channel that every other device is trying to secure. When two devices seize the same channel, the separate communications between respective base units and handsets may "interfere" with one another causing a degradation in channel clarity. This may cause each device to retrieve another channel from its ranking memory, such as the second highest ranked channel (i.e., next clearest channel). However, because each device has ranked the channels in the same manner, the second highest ranked channel in each device will be identical. When the devices attempt to communicate over this second channel they will again interfere with each other. This interference will continue until each of the devices happens to select a different channel, perhaps due to the fact that some channels farther down the list of ranked channels have been ranked differently by each respective device.

The present invention provides a solution to this problem. Returning to FIG. 1, the scanning unit or scanning means 2 again scans the channel environment 10. The channels so scanned are then ranked by channel clarity using ranking/ordering unit or ranking means 3. Once this is completed the channels are then separated into groups by unit 3. The number of groups created may vary. Each group, however, represents a range of channel clarity where the channels within each group provide a perceptually equivalent level of clear communications. For example, suppose $f_1, f_2, f_3 \ldots f_N$ represents ten channels which have been ranked from 1 to 10. Within this group of ten channels, however, the first three channels may all fall within a certain clarity/quality range, the next three within a second, somewhat lower range of quality, while the last four may fall into still a third, lowest range of quality. Each range may represent a range of RSSI power levels, e.g., the first range may have RSSI levels from 1 up to 9, the second from 10 to 19, the third from 20 and up. Using the example of three different ranges of quality would result in three different groups of channels being formed by ranking unit 3. To reiterate, within each group are a distinct number of channels. The common "denominator" being that each channel within a group is a phone link that is substantially, equally clear, i.e., the user perceives no difference in clarity.

In an alternate embodiment of the invention, once the channels have been grouped, the ranking/ordering unit 3 may store the groups of channels in a ranking/ordering memory or memory means 7.

In any event, the ranking/ordering unit 3 next selects a "non-channel-clarity" or ordering algorithm from an algorithm memory or memory means 4. By "non-channel-clarity" algorithm is meant an algorithm which does not rank channels based on channel clarity. Instead, this type of algorithm "orders" channels based on some other criteria. That is, the channels are placed in an order within a group unrelated to their channel clarity rankings. There are a number of non-channel-clarity algorithms which can be used. For example, in one embodiment of the invention this algorithm comprises ordering channels according to their frequency. In another embodiment this algorithm comprises ordering channels by channel number. In a preferred embodiment of the invention, the algorithm memory 4 comprises a number of non-channel-clarity algorithms. Upon power up of the device 1, or at another time (e.g., after each call), or upon input of a password or code into device 1, or upon selection using other means known in the art, the device 1 selects a non-channel-clarity algorithm from memory 4. In one embodiment of the invention, this selection is done randomly so that any one of the algorithms stored in memory 4 may be selected.

Once the algorithm is selected, the ranking/ordering unit 3 then orders each group separately. Using the example above, the ranking/ordering unit 3 may order the group of three highest quality channels first. For example, suppose the first group comprises channels which have the following characteristics:

| Rank | 1 | 2 | 3 |
|---|---|---|---|
| RSSI level | 7 | 8 | 9 |
| Channel No. | 4 | 2 | 7 |

Again the initial ranking was based on clarity (RSSI level). Note that all of these channels have an RSSI level between 1 and 10 and are therefore grouped together.

If the ranking/ordering unit 3 then selects a non-channel-clarity algorithm which orders channels by increasing channel number, regardless of channel quality, the channels will then be ordered differently as follows:

| Order | 1 | 2 | 3 |
|---|---|---|---|
| Channel No. | 2 | 4 | 7 |
| RSSI level | 8 | 7 | 9 |

As a result, channel 2 would be ordered the highest instead of channel 4, After ordering the channels within the first group, the ranking/ordering unit 3 would then proceed to order the channels within each remaining group using the same, non-channel-clarity algorithm. Ordering would continue until all of the groups of channels are ordered.

In another, alternative embodiment of the invention the non-channel-clarity algorithm may comprise a pseudorandom number generation algorithm which randomly orders the channels within each group using pseudorandom number generation schemes well known in the art. Thus, not only can the algorithm be randomly selected by the ranking/ordering unit 3 but one of the algorithms itself may randomly order channels within each group.

Again, this algorithm selection is typically completed by the device 1 during a "sniff" mode. Once the device 1 leaves its sniff mode and establishes a connection on a known channel, it is then instructed to seize an available channel. It will do so by first checking those channels which have been ordered using one of the non-channel-clarity algorithms. The chances are that the channel selected by a device using a non-channel-clarity algorithm will be different than the channel selected by a device which is not using such an algorithm. In addition, because different algorithms can be selected the chances are that two devices using two different non-channel-clarity algorithms will select different channels as well.

The ordered channels may be stored in a ranking memory or memory means 7. Ranking/ordering unit 3, ranking/ordering memory 7 and algorithm memory 4 may comprise separate units, may be combined into one unit 5, or may be further broken down into further components.

Though FIG. 1 depicts the device 1 as being separate from the handset 8, the present invention also envisions devices where the device 1 comprises a handset.

In yet another embodiment of the invention, only one non-channel-clarity algorithm is stored in memory 4. In this case, however, each device 1 may be programmed with a different algorithm. Thus, although each device can only use one algorithm, the same algorithm is not necessarily being used by another device. Again, because two devices are using different algorithms to order the same channels, the chances of interference occurring is reduced.

A wide variety of non-channel-clarity algorithms may be used. For example, an additional algorithm may comprise ordering the channels within a group as a function of the last channel used by the device 1 and handset 8. Thus, once the device leaves its sniff mode it may select an algorithm which reviews the last channel used and proceeds to order channels using this last channel as a "centerpiece." That is, the last channel used will be ordered first. Therefore, the remaining channels within a group or groups may be ordered as described before. Inherently, an algorithm which orders the last channel used first makes sense because, normally, this channel was the best channel available for the prior call and may likely be the best channel available for a next call.

As can be imagined, the present invention can be carried out by a number of devices and systems. Each of these devices or systems will follow the same methodology, however. Accordingly, a number of methods may be used to realize the advantages offered by the present invention.

Figure 2A:
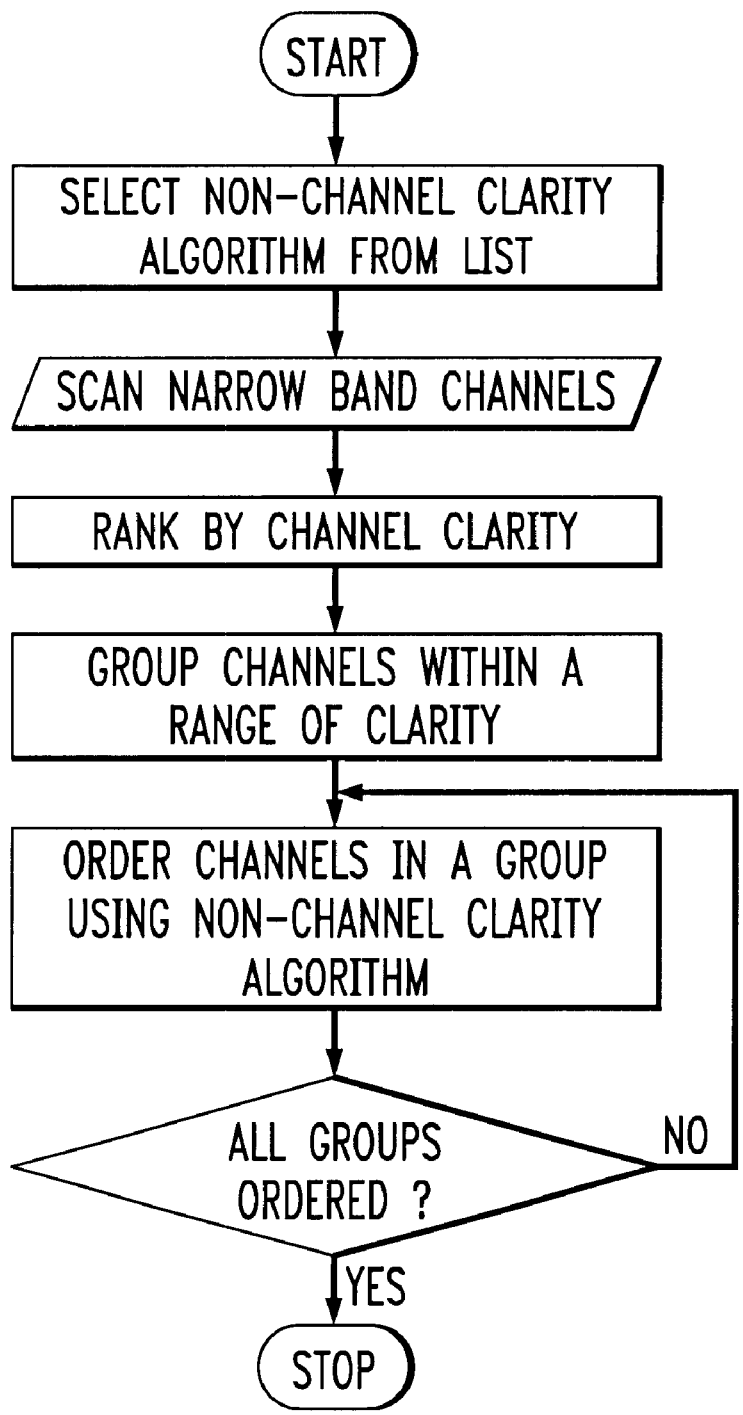
FIG. 2A depicts a flowchart of methods for ordering narrow band, communication channels according to an embodiment of the present invention.

FIGS. 2A and B show flow diagrams of two exemplary methods according to the present invention.

It should be understood from the outset that the following description of methods which can be used to carry forth the present invention are meant as examples. That is, other equivalent methods which use additional processes, or combine processes together or use different sequences of identical processes as described below may be used and are within the scope of the present invention.

FIG. 2A represents methods where a non-channel-clarity algorithm is selected from a list of stored algorithms. This selection may be random or carried out by other means known in the art.

Figure 2B:
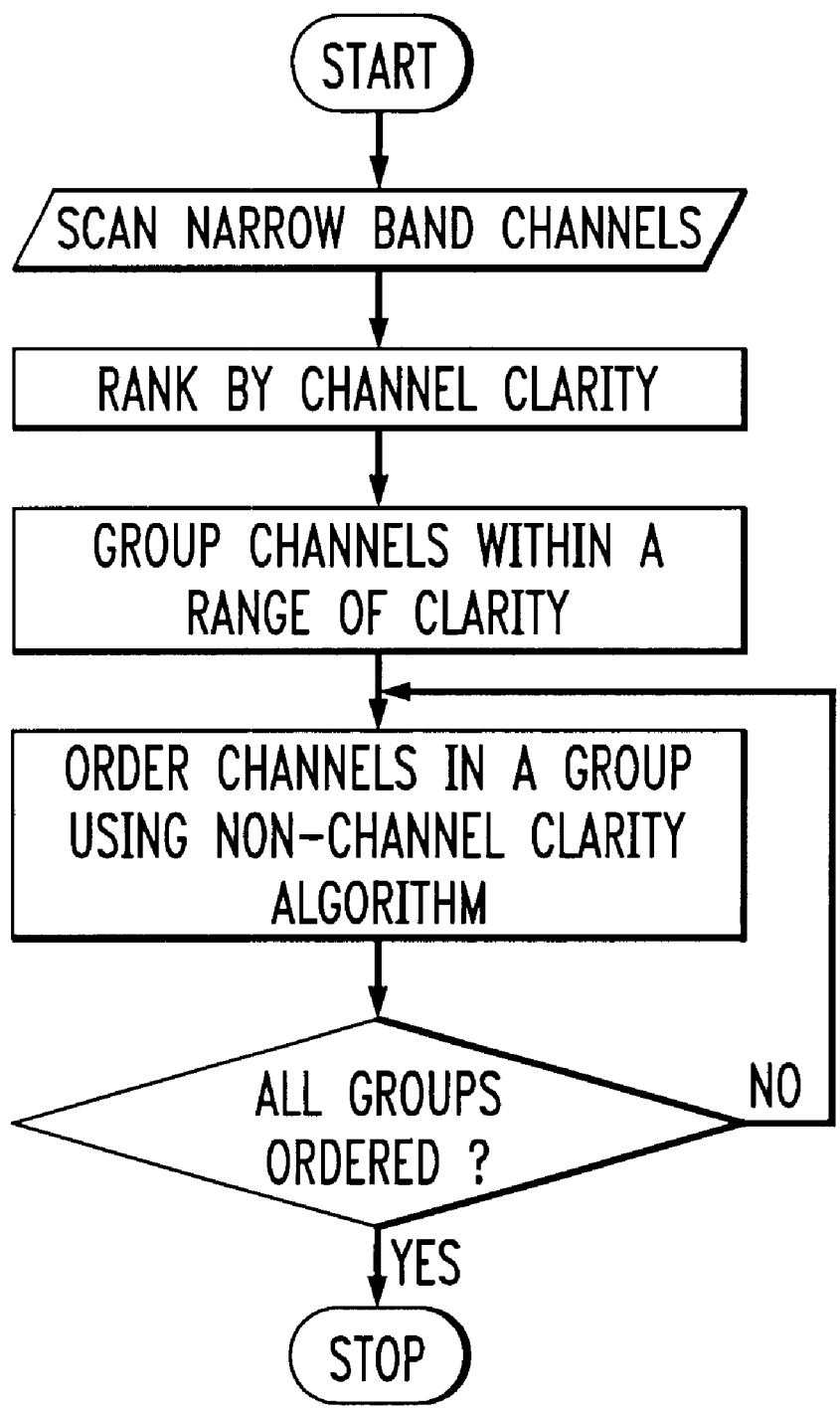
FIG. 2B depicts a flowchart of methods for ordering narrow band, communication channels according to another embodiment of the present invention.

FIG. 2B is almost identical to the methods depicted in FIG. 2A except that the methods depicted in FIG. 2B do not select an algorithm from a list of stored algorithms, as in the methods illustrated by FIG. 2A. To reiterate, the sequences depicted in FIG. 2A and 2B are for explanation purposes; other sequences may be used which are within the scope of the present invention. For example, the selection of a non-channel-clarity algorithm may occur at a time other than that shown in FIG. 2A.

That said, one method comprises scanning narrow band, communication channels in a given channel environment; grouping the scanned channels into channel groups, where each group comprises a channel or channels having a channel clarity within a certain range; and ordering each group using a non-channel-clarity algorithm.

As before, a list of available algorithms may comprise algorithms which: order channels within each group by channel number or channel frequency; or which comprises a pseudo-random number generator for randomly ordering channels within each channel group.

In an alternative embodiment of the invention, another method comprises selecting a non-channel-clarity algorithm from a list which comprises a number of non-channel-clarity algorithms. This selection may be random or may be carried out using techniques well known in the art.

Alternative methods may comprise storing the grouped, ordered channels and/or storing the non-channel-clarity algorithms.

Each of the methods just outlined may utilize a number of devices. Among them are a cordless telephone system, base of a cordless telephone or a handset of a cordless telephone.

Figure 3:
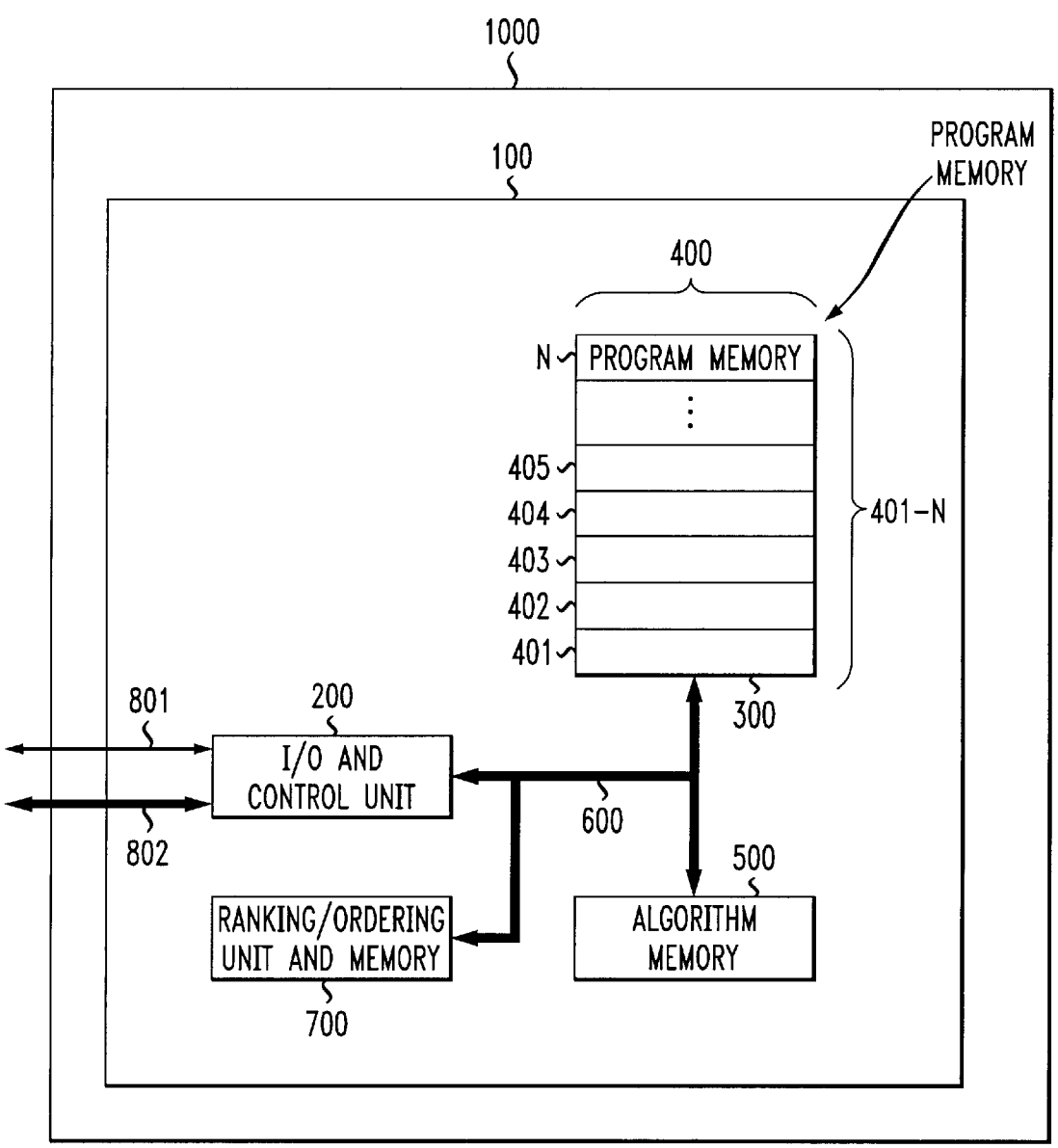
FIG. 3 depicts a programmed device for ordering narrow band, communication channels according to another embodiment of the present invention.

Many of the functions carried out by the device 1 in FIG. 1 may be carried out by a programmed device, such as device 100 shown in FIG. 3.

The device 100 receives signals and data via pathways 801,802. These signals are received by an input/output and control unit 200. One of these signals instructs the programmed device 100 to enter a sniff mode.

In this mode, the programmed device 100 will fetch program code or program code means 401-N which makes up a program or program means 400 stored in a program memory or memory means 300.

The device 100, in conjunction with program code 401-N, will rank and/or order narrow band, communication channels upon entering the sniff mode.

To do this, the programmed device 100 first selects program code means or program code 401 which instructs the device 1000 to scan the channel environment surrounding the device 1000. As is apparent from FIG. 3, the programmed device 100 is a part of a larger device 1000. The device 1000 may comprise a cordless telephone system, base of a cordless telephone system or handset of a cordless telephone system. To simplify the present explanation, the selection process may be carried out by control means in the input/output and control unit 200 or in another unit (not shown) known by those in the art.

Data representative of the scanned channels is received by the input output unit 200 and may be temporarily stored in a memory which may reside in the input/output and control unit 200 or in another memory (not shown) known to those in the art. The device 100 next fetches program code means or program code 402 which instructs ranking/ordering and memory unit 700 or the like to group the scanned channels into channel groups. Each of the groups is again assembled based on placing channels of similar clarity within the same group. Once these groups are ranked they may be stored in ranking/ordering memory 700 using instructions or the like embedded in program code means 403.

In one embodiment of the invention, the device then fetches program code means 404 which instructs the ranking/ordering unit 700 or the like to order the grouped channels according to a non-channel-clarity algorithm stored in algorithm memory 500. The algorithm may comprise an algorithm which orders the channels within each group by channel number or by frequency. In another embodiment, the algorithm may comprise a pseudorandom number generation algorithm which randomly orders the channels within each group. Of course, other non-channel clarity algorithms may be used, such as the "last channel used" algorithm discussed before. Once again, after the groups have been ordered, programmed device 100 may fetch program code means 403 which helps to store the ordered channels in memory 700.

Programmed devices according to embodiments of the present invention also comprise program code means or program code 405 for selecting a non-channel-clarity algorithm from a number of algorithms stored in algorithm memory 500. In yet another embodiment of the invention the program code means 405 further comprises code or code means for randomly selecting a non-channel-clarity algorithm from memory 500 or the like.

Though shown as a part of programmed device 100, memories 500 and 700 may be a part of another section of device 1000 or may reside outside of device 1000.

Communication between the units of device 100 is carried out over internal bus 600 or the like.

It should be apparent that a number of different, non-channel-clarity algorithms may be used. For example, algorithms which: order the groups of channels by decreasing channel number or frequency; order according to an increasing channel number or frequency; or order according to a "last channel used" may be used.

In all of the embodiments discussed above, it can be seen that the present invention reduces the risk that two on-going communications, i.e., telephone calls, will interfere with one another. Though a device or method envisioned by the present invention may not select the best available channel for fear that another device or method may have already, or is about to, select the same channel, it will select a channel which was substantially the same quality. The ranges of clarity which are used to group channels together in each of the embodiments discussed above are preferably a perceptible range of clarity. That is, though one of the three channels in the highest quality channel grouping may be the best channel, there is no perceptible difference between any of the three: a user of a device or method which comprises the features of the present invention would not notice a difference in the clarity of a telephone call using any one of the three channels.

It is to be understood that changes and variations may be made without departing from the spirit and scope of this invention as defined by the claims that follow.

We claim:

1. A communications device for ordering narrow band, communication channels comprising:
   a scanning unit for scanning narrow band communication channels; and
   a ranking unit for grouping the scanned channels into channel groups, each group comprising a channel or channels which has a channel clarity within a certain range, for selecting a non-channel clarity algorithm from a number of non-channel-clarity algorithms and for ordering each group of channels using the selected a non-channel-clarity algorithm.

2. The device as in claim 1 wherein the non-channel-clarity algorithm comprises ordering the channels within each group by channel number.

3. The device as in claim 1 wherein the non-channel-clarity algorithm comprises ordering the channels within each group by channel frequency.

4. The device as in claim 1 wherein the non-channel-clarity algorithm comprises a pseudorandom number generation algorithm for randomly ordering the channels within each group.

5. The device as in claim 1 wherein the non-channel-clarity algorithm comprises a last channel used algorithm.

6. The device as in claim 1 further comprising an algorithm memory for storing the non-channel-clarity algorithm.

7. The device as in claim 1 further comprising a memory for storing the ordered groups of channels.

8. The device as in claim 1 wherein the ranking unit is adapted to randomly select the non-channel-clarity algorithm from the number of non-channel-clarity algorithms.

9. The device as in claim 1 further comprising an algorithm memory for storing the non-channel-clarity algorithms.

10. The device as in claim 1 wherein the range of channel clarity is a perceptible range of channel clarity.

11. The device as in claim 1 wherein the device comprises a cordless telephone system.

12. The device as in claim 1 wherein the device comprises a base of a cordless telephone system.

13. The device as in claim 1 wherein the device comprises a handset of a cordless telephone system.

14. A communications device for ordering narrow band, communication channels comprising:
   scanning means for scanning narrow band communication channels; and
   ranking means for grouping the scanned channels into channel groups, each group comprising a channel or channels which has a channel clarity within a certain range, for selecting a non-channel clarity algorithm from a number of non-channel-clarity algorithms and for ordering each group of channels using the non-channel-clarity algorithm.

15. The device as in claim 14 wherein the non-channel-clarity algorithm comprises ordering the channels within each group by channel number.

16. The device as in claim 14 wherein the non-channel-clarity algorithm comprises ordering the channels within each group by channel frequency.

17. The device as in claim 14 wherein the non-channel-clarity algorithm comprises a pseudorandom number generation algorithm for randomly ordering the channels within each group.

18. The device as in claim 14 wherein the non-channel-clarity algorithm comprises a last channel used algorithm.

19. The device as in claim 14 further comprising algorithm memory means for storing the non-channel-clarity algorithm.

20. The device as in claim 14 further comprising memory means for storing the ordered groups of channels.

21. The device as in claim 14 wherein the ranking means is adapted to randomly select the non-channel-clarity algorithm from the number of non-channel-clarity algorithms.

22. The device as in claim 14 further comprising algorithm memory means for storing the non-channel-clarity algorithms.

23. The device as in claim 14 wherein the range of channel clarity is a perceptible range of channel clarity.

24. The device as in claim 14 wherein the device comprises a cordless telephone system.

25. The device as in claim 14 wherein the device comprises a base of a cordless telephone system.

26. The device as in claim 14 wherein the device comprises a handset of a cordless telephone system.

27. A method for ordering narrow band, communication channels for a communications device comprising"
   scanning narrow band communication channels;
   grouping the scanned channels into channel groups, each group comprising a channel or channels which has a channel clarity within a certain range;
   selecting a non-channel clarity algorithm from a number of non-channel-clarity algorithms; and
   ordering each group of channels using the non-channel-clarity algorithm.

28. The method as in claim 27 wherein the non-channel-clarity algorithm comprises an algorithm for ordering the channels within each group by channel number.

29. The method as in claim 27 wherein the non-channel-clarity algorithm comprises an algorithm for ordering the channels within each group by channel frequency.

30. The method as in claim 27 wherein the non-channel-clarity algorithm comprises a pseudorandom number generation algorithm for randomly ordering the channels within each group.

31. The method as in claim 27 wherein the non-channel-clarity algorithm comprises a last channel used algorithm.

32. The method as in claim 27 further comprising storing the non-channel-clarity algorithm.

33. The method as in claim 27 further comprising storing the ordered groups of channels.

34. The method as in claim 27 further comprising randomly selecting the non-channel-clarity algorithm from the number of non-channel-clarity algorithms.

35. The method as in claim 27 further comprising storing the non-channel-clarity algorithms.

36. The method as in claim 27 wherein the range of channel clarity is a perceptible range of channel clarity.

37. The method as in claim 27 wherein the device comprises a cordless telephone system.

38. The method as in claim 27 wherein the device comprises a base of a cordless telephone system.

39. The method as in claim 27 wherein the device comprises a handset of a cordless telephone system.

40. A programmed device for ordering narrow band, communication program means, the program means comprising:

program code means for scanning narrow band, wireless communication channels;

program code means for grouping the scanned channels into channel groups, each group comprising a channel or channels which has a channel clarity within a certain range;

program code means for selecting a non-channel clarity algorithm from a number of non-channel-clarity algorithms; and program code means for ordering each group of channels using the non-channel-clarity algorithm.

41. The programmed device as in claim 40 wherein the non-channel-clarity algorithm comprises ordering the channels within each group by channel number.

42. The programmed device as in claim 44 wherein the non-channel-clarity algorithm comprises ordering the channels within each group by channel frequency.

43. The programmed device as in claim 43 wherein the non-channel-clarity algorithm comprises a random number generation algorithm for randomly ordering the channels within each group.

44. The programmed device as in claim 40 wherein the non-channel-clarity algorithm comprises a last channel used algorithm.

45. The programmed device as in claim 40 further comprising program code means for storing the ordered groups of channels.

46. The programmed device as in claim 40 wherein the code means for selecting further comprises code means for randomly selecting the non-channel-clarity algorithm from the number of non-channel-clarity algorithms.

47. The programmed device as in claim 40 further comprising program code means for storing the non-channel-clarity algorithms.

48. The programmed device as in claim 40 wherein the range of channel clarity is a perceptible range of channel clarity.

49. The programmed device as in claim 40 wherein the device comprises part of a cordless telephone system.

50. The programmed device as in claim 40 wherein the device comprises part of a base of a cordless telephone system.

51. The programmed device as in claim 40 wherein the device comprises part of a handset of a cordless telephone system.

\* \* \* \* \*